Oct. 26, 1926.

T. WHITE

PLANTER

Filed Oct. 16, 1923

1,604,624

WITNESSES
R. W. Hoagland

INVENTOR
Thomas White
BY
ATTORNEYS

Patented Oct. 26, 1926.

1,604,624

UNITED STATES PATENT OFFICE.

THOMAS WHITE, OF MARION, MICHIGAN.

PLANTER.

Application filed October 16, 1923. Serial No. 668,865.

This invention relates to planters and has for its object the provision of a device for depositing in the ground at intervals a predetermined quantity of seed.

A further object of the invention is the provision of a device which automatically measures the quantity of seed to be planted at predetermined intervals and which automatically releases and deposits said seed in the ground periodically.

This invention will be best understood from a consideration of the following detailed description in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings—

Figure 1:
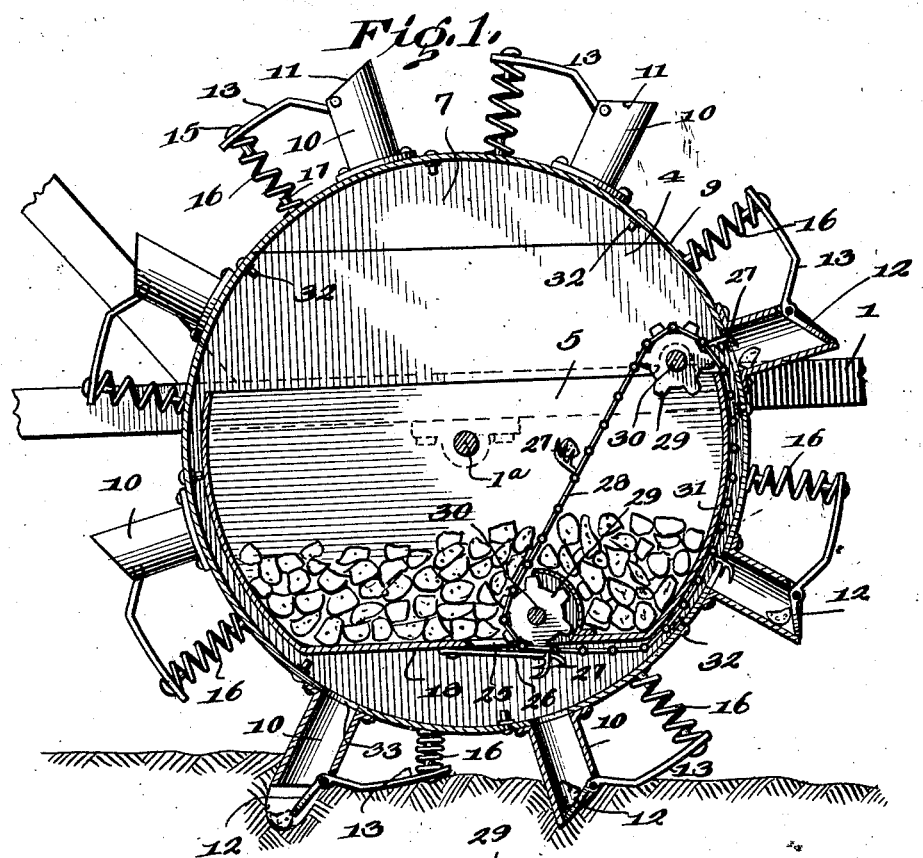
Figure 1 is a vertical section of the invention with some of the plant spouts in elevation.
Figure 2:
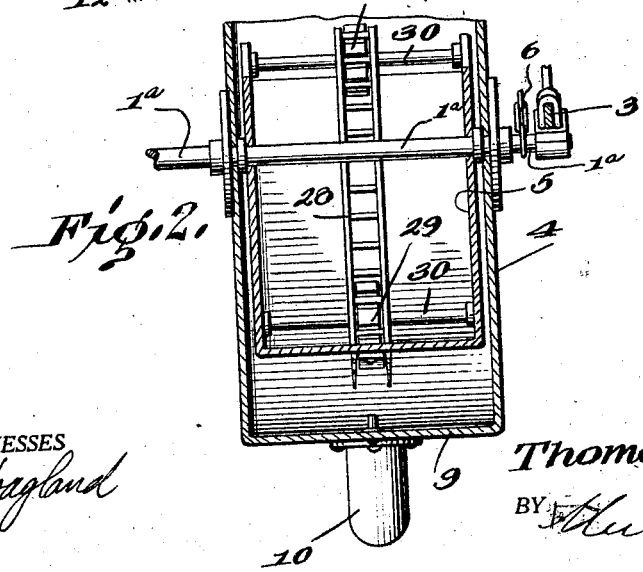
Figure 2 is a fragmentary vertical section taken along the horizontal axis of a planting drum.

Located within each drum 4 is a semi-circular receptacle 5 which is carried by the axle 1ª without rotation while the drum 4 rotates about the container 5 and said axle. The container is adapted to form a receptacle for carrying the seeds. The seeds are deposited in the container 5 through an opening formed by cutting off the top of the drum. The severed portion is hingedly connected to the lower portion of the drum to form a closure 7 for the drum.

Spaced openings 8 are formed in the rim or periphery 9 of the drums 4 and are in communication with spouts 10 formed integrally with the rim 9 or separately connected therewith. The outer free end of each spout is shirred at an angle as shown at 11 and is provided with a closure 12. A bent or curved arm 13 is rigidly connected with the lip 12 forming a bell crank construction which is pivoted at 14 in the spout 10. The outer end of the arm or lever 13 is provided with a pin 15 adapted to receive one end of the coil spring 16. The other end of the coil spring is received by a pin 17 mounted upon the rim 9. The bottom of the substantially semi-circular container 5 is flattened as shown at 18, having an opening 25 therein, with a lip 26 in close association with the opening to prevent loss of seeds from the container 5. The lip 26 is provided with slots through which forks 27 mounted on chain 28, pass. The forks pick up seed potatoes and drop them into the inner ends of the spouts 10 when said spouts reach the position shown in Figure 6. The chain 28 is supported by the toothed wheels 29 mounted upon axles 30. These axles are supported in bearings on the opposite inner wall of the casing 5. The chain travels around the outer arcuately shaped wall 31 of the container 5. Mounted upon the inner wall of the rim 9 of the drum 4 are lugs 32, which are adapted to engage the links of the chain 28 and cause movement of the chain as the drum 4 is rotated.

The position of the forks 27 is such relative to the openings 33 in the rim 9 of the drum 4 which aline with the hollow spouts 10, that one of the forks will always aline with the said opening in the rim 9 for discharging a seed element into a spout 10, as shown in Figure 1. At predetermined times or at such intervals for which the drum has been designed for depositing the seed elements into the ground, the levers 13 will be operated against the tension of the spring 16 and remove the closure 12 from the open end of said spouts and deposit the seed element in the ground.

The opening at the top of the drum is of sufficient scope to permit the removal of the container 5 from said drum through said opening when the shaft 1ª has been removed.

Any form of latch means is employed for locking the cover against movement when the drums are rotating, since the cover 7 carries spouts 10 in similarly spaced relation with spouts on drum 4.

I claim:

1. In a planter, a drum adapted to be rotated having a plurality of spouts in open communication with the drum, an open ended seed container in the drum, and means for feeding the seeds to the spouts and comprising sprockets mounted in the container, said container having an opening in its lower end, an endless chain trained on the sprockets and over the outer wall of the container and between said container and the inner wall of the drum, said chain adapted to travel through the opening in the container, lugs on the inner wall drum adapted to engage and drive said chain when the drum is revolved, and means carried by the chain adapted to pick up seeds and deposit the seeds in the spouts.

2. In a planter, a drum adapted to be rotated having a plurality of spouts in open communication with the drum, an open ended seed container in the drum and means for feeding the seeds to the spouts comprising an endless chain, means for supporting said chain, said container being provided with an opening with the chain movable through the opening and around the outer wall of the container, lugs on the inner wall of the drum adapted to engage the chain for causing movement of the chain, and means carried by the chain adapted to pick up seeds and deposit the same in the spouts.

THOMAS WHITE.